US012025292B2

(12) United States Patent
Bremerich

(10) Patent No.: US 12,025,292 B2
(45) Date of Patent: Jul. 2, 2024

(54) ARCHITECTURAL LIGHT FIXTURE

(71) Applicant: Matthias Bremerich, Lennestadt (DE)

(72) Inventor: Matthias Bremerich, Lennestadt (DE)

(73) Assignee: ERCO GMBH, Luedenscheid (DE)

( * ) Notice: Subject to any disclaimer, the term of this patent is extended or adjusted under 35 U.S.C. 154(b) by 0 days.

(21) Appl. No.: 16/842,360

(22) Filed: Apr. 7, 2020

(65) Prior Publication Data

US 2021/0018164 A1   Jan. 21, 2021

(30) Foreign Application Priority Data

Jul. 19, 2019   (DE) .......................... 102019119682.5

(51) Int. Cl.
| | |
|---|---|
| *F21V 17/00* | (2006.01) |
| *F21V 3/00* | (2015.01) |
| *F21V 5/00* | (2018.01) |
| *F21V 5/04* | (2006.01) |
| *F21V 11/00* | (2015.01) |
| *F21W 121/00* | (2006.01) |
| *F21Y 115/10* | (2016.01) |

(52) U.S. Cl.
CPC .............. *F21V 17/002* (2013.01); *F21V 3/00* (2013.01); *F21V 5/008* (2013.01); *F21V 5/045* (2013.01); *F21V 5/048* (2013.01); *F21V 11/00* (2013.01); *F21W 2121/004* (2013.01); *F21Y 2115/10* (2016.08)

(58) Field of Classification Search
CPC .......... F21V 17/002; F21V 3/00; F21V 5/008; F21V 5/045; F21V 5/048; F21V 11/00; F21Y 2115/10; F21W 2121/004; F21W 2131/107; F21W 2131/304; G02B 19/0028; G02B 19/0061; F21S 8/063
See application file for complete search history.

(56) References Cited

U.S. PATENT DOCUMENTS

| | | | |
|---|---|---|---|
| 6,282,027 B1 | 8/2001 | Hough | |
| 8,042,972 B2 | 10/2011 | Joergensen et al. | |
| 8,475,011 B2 | 7/2013 | Kayanuma | |
| D845,115 S | * 4/2019 | James | ............................ D8/373 |

(Continued)

FOREIGN PATENT DOCUMENTS

| | | | | |
|---|---|---|---|---|
| CN | 206222084 U | * 6/2017 | ............. | F21K 9/232 |
| CN | 206222084 U | 6/2017 | | |

(Continued)

OTHER PUBLICATIONS

Machine English Translation of CN206222084U; Wang (Year: 2017).*

*Primary Examiner* — Zheng Song
*Assistant Examiner* — Glenn D Zimmerman
(74) *Attorney, Agent, or Firm* — Andrew Wilford

(57) ABSTRACT

The invention relates, inter alia, to a light fixture (10) for illuminating building surfaces (44) or partial building surfaces, in particular a spotlight (11), comprising an in particular cylindrical housing (13) in which at least one LED (14), a collimator (15) and a singular lens element (16) formed as a scattering lens, are arranged, wherein the outside diameter (17) of the lens element extends as far as an inner peripheral surface (18) of the housing (13), wherein the lens element comprises a concavely curved light entry surface (19) and a planar or slightly convexly curved light exit surface (20).

24 Claims, 12 Drawing Sheets

(56) References Cited

U.S. PATENT DOCUMENTS

Figure 1:
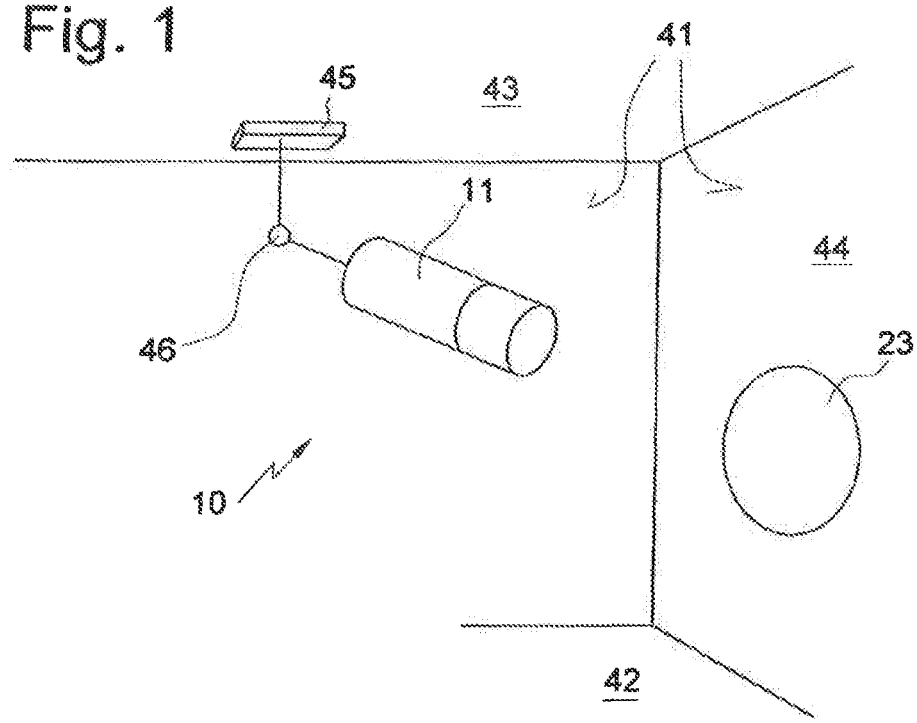

| | | | | |
|---|---|---|---|---|
| 2004/0042085 A1* | 3/2004 | Hough | ............... | G02B 27/0961 |
| | | | | 362/555 |
| 2006/0176696 A1* | 8/2006 | Hough | ...................... | F21V 9/40 |
| | | | | 362/268 |
| 2010/0008082 A1* | 1/2010 | Brass | ........................ | F21V 5/04 |
| | | | | 362/202 |
| 2011/0211350 A1* | 9/2011 | Klipstein | ............... | H05B 45/38 |
| | | | | 362/244 |
| 2011/0267823 A1* | 11/2011 | Angelini | ............... | F21V 14/065 |
| | | | | 362/277 |
| 2012/0176781 A1* | 7/2012 | Witsch | .................. | F21V 23/006 |
| | | | | 362/241 |
| 2014/0022794 A1 | 1/2014 | Laukanen | | |
| 2015/0276170 A1* | 10/2015 | Motoyanagi | ....... | G02B 19/0061 |
| | | | | 362/335 |
| 2017/0254525 A1* | 9/2017 | Klafta | .................... | F21K 9/233 |
| 2020/0041098 A1* | 2/2020 | Dross | ................. | G02B 19/0028 |

FOREIGN PATENT DOCUMENTS

| | | | | |
|---|---|---|---|---|
| CN | 109237366 A | 1/2019 | | |
| DE | 202011108791 U1 | 4/2012 | | |
| DE | 102013021053 B4 | 6/2015 | | |
| EP | 2492578 A2 * | 8/2012 | ................ | F21S 8/02 |
| EP | 2492578 A2 | 8/2012 | | |
| JP | 4235427 B2 | 3/2009 | | |
| WO | WO-2018162310 A1 * | 9/2018 | .............. | F21V 13/04 |
| WO | WO-2020157149 A1 * | 8/2020 | ............. | B60K 35/00 |

\* cited by examiner

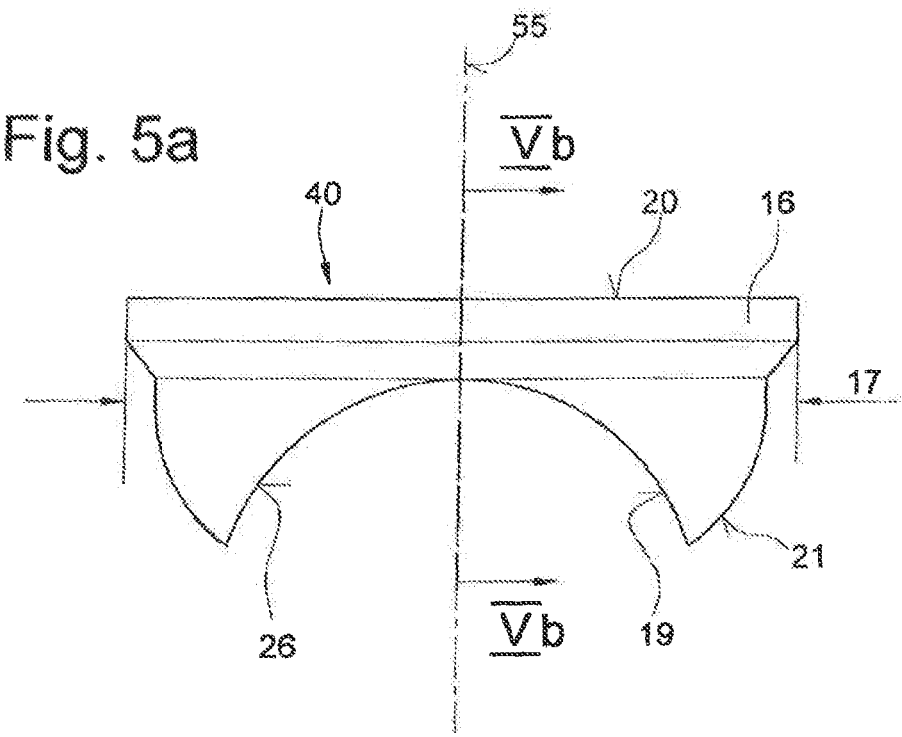
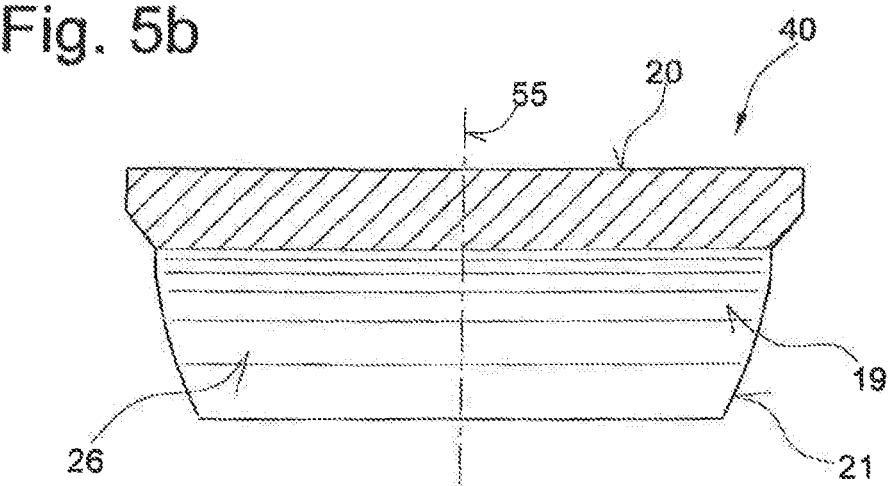

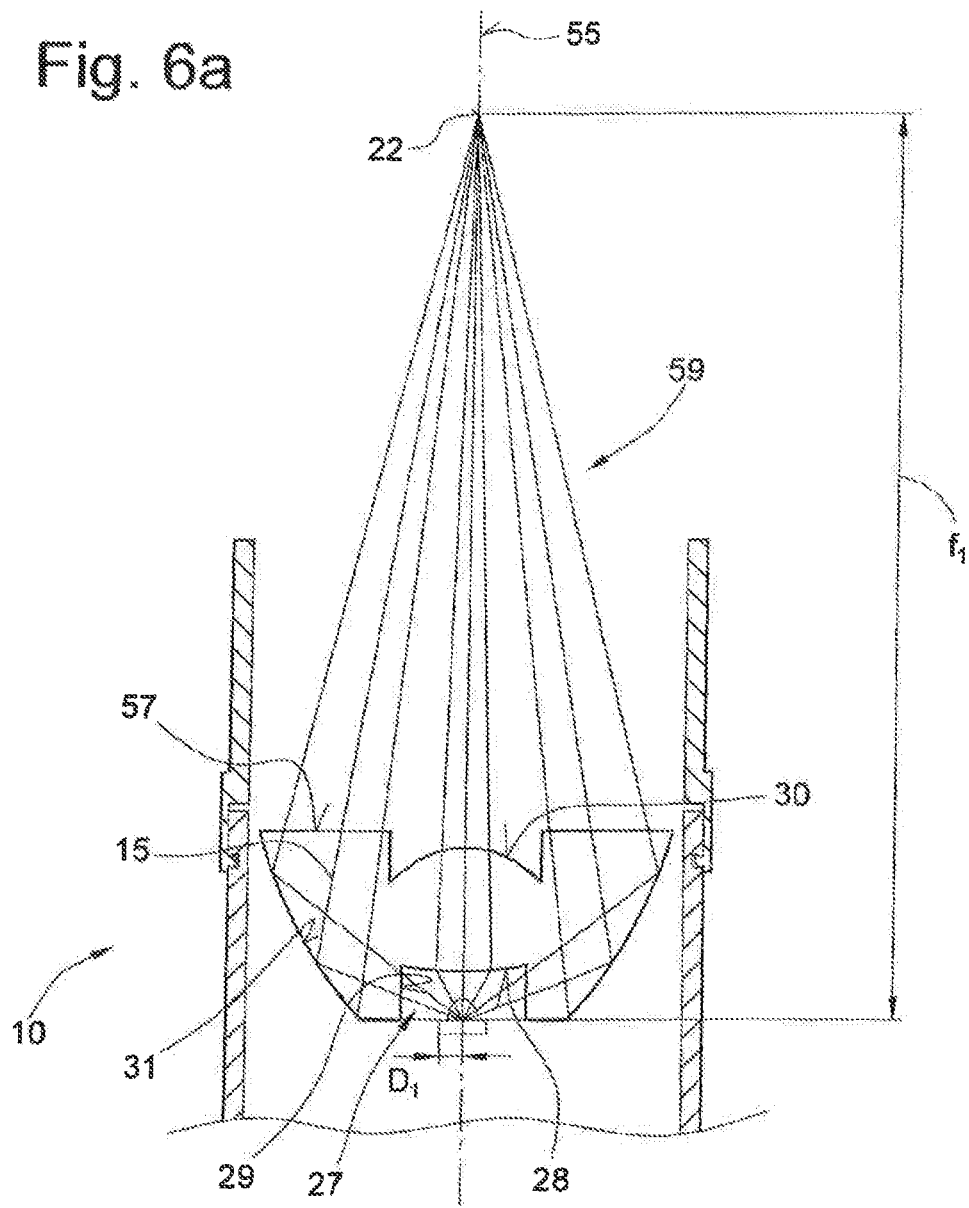

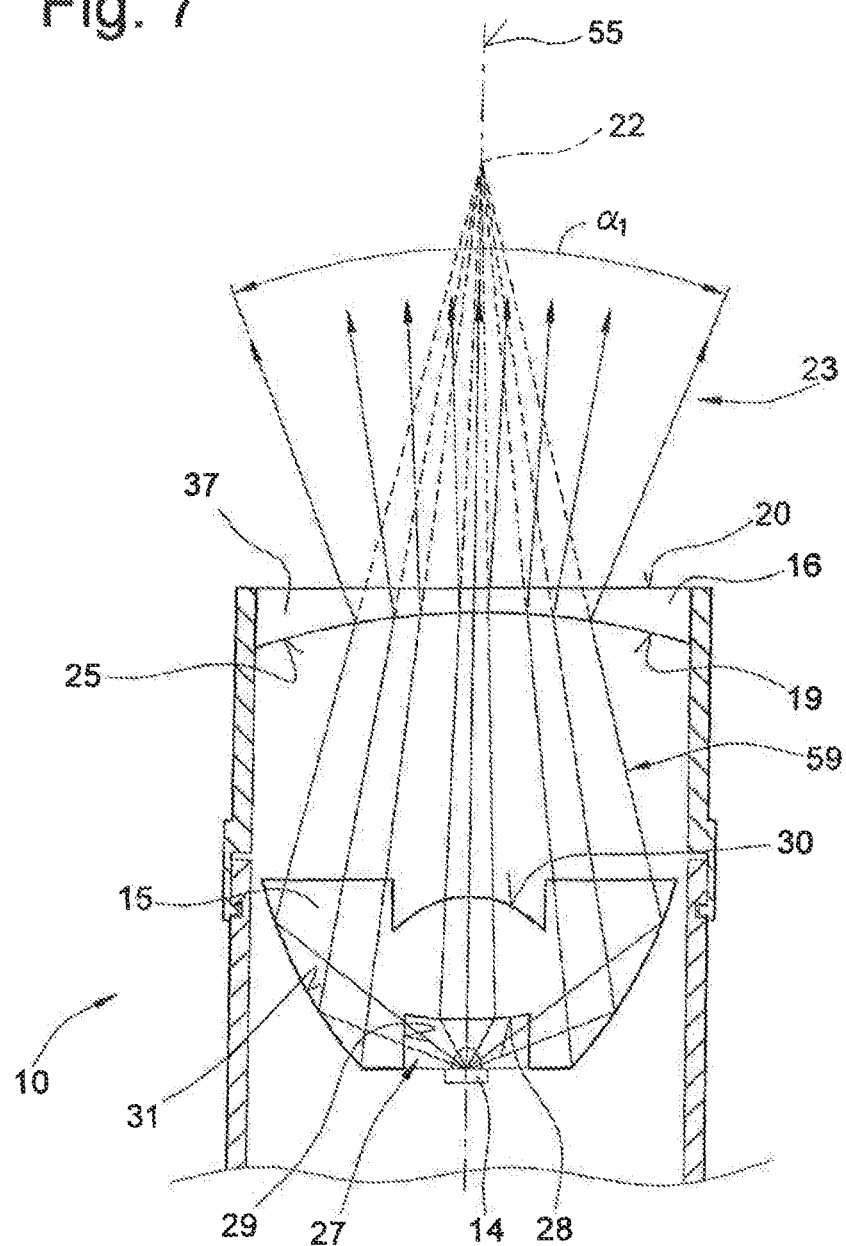

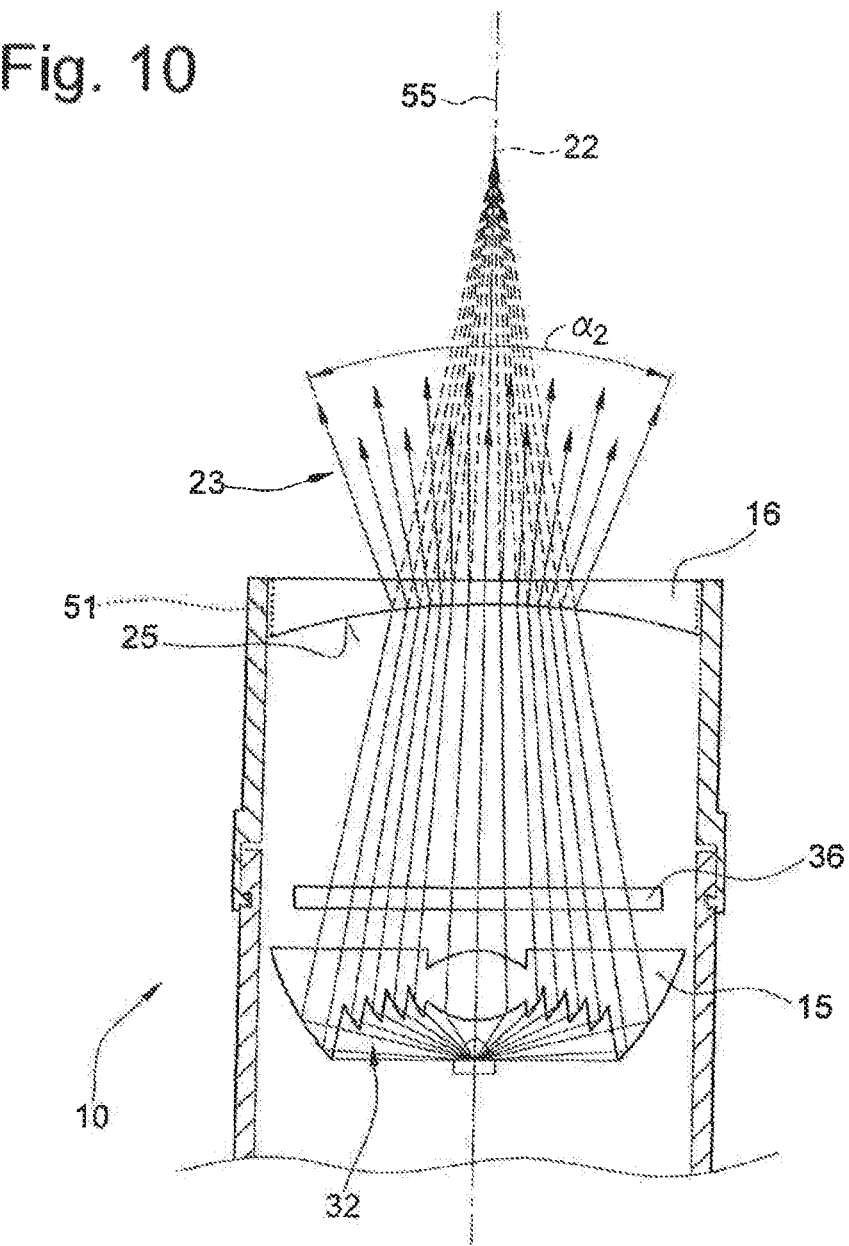

ARCHITECTURAL LIGHT FIXTURE

The invention relates to a light fixture according to claim 1.

The applicant has been developing and manufacturing light fixtures for decades. The known light fixtures are used for illumination of a building surface or a building partial surface, for example a wall surface, a floor surface of a building, or an external surface assigned to a building, e.g. a path surface. Building partial surfaces are also understood to be, for example, works of art, such as paintings or statues that are also arranged in a building or are assigned to a building of this kind.

The fundamental change in the lamps used in light fixtures of this kind, toward the operation of LEDs, and in particular also the change in the supply voltage from a conventional 120/230 volt alternating current to supply voltages of between 20 and 50 volts that is associated with the change in the lamps, is associated with a miniaturization of the structure and design of light fixtures.

DE 10 2008 063 369 A1 discloses a light fixture in which a lens plate comprising a plurality of microstructures is arranged in an exchangeable manner. Exchanging the lens plate makes it possible for the light distributer of the light fixture to be changed.

Proceeding from the light fixture disclosed in the patent application described above, it is desirable to provide a light fixture that can be assembled in a modular manner, that allows for a change in the light distribution of the light fixture by simple means, and that generates a qualitatively high-quality light distribution at very high efficiency.

The invention achieves this object by the features of claim 1.

The principle of the invention essentially consists in equipping a light fixture with a singular lens element. The light fixture may comprise a cylindrical housing, for example a circular cylindrical housing. The singular lens element may have a circular cylindrical outer peripheral surface, and an outside diameter thereof may extend as far as the inner peripheral surface of the housing.

The singular lens element comprises a concavely curved light entry surface, and a planar or slightly convexly curved light exit surface. The entry surface may be cylindrically curved or doubly concavely curved, i.e. spherical or approximately spherical.

In this respect, the singular lens element comprises a concave light entry surface that extends from the edge region on one side of the housing as far as the edge region of the housing that is 180° opposite. The lens element can thus collect all the light emitted by the collimator.

By means of a light fixture structure of the type proposed according to the invention, it is possible to easily achieve a change in the light distribution of the light fixture. For this purpose, the lens element simply has to be exchanged for another lens element having a differently designed light entry surface.

The light emitted by the LEDs is collimated by the collimator. In this case, in a first variant of the invention the collimator can emit a parallel light beam that is cast onto the light entry surface of the lens element. In an alternative of the invention, a collimator can be used that collimates the light emitted by the LEDs to such an extent that a focused light beam is emitted that is focused in a focal point or a focal point region. The focal point or the focal point region can be located, for example, on the optical axis of the light fixture. The lens element is arranged between the collimator and the focal point or the focal point region, and can spread out the light beam that strikes it. In this respect, the lens element functions as a diverging lens.

The greater the concave curvature of the light entry surface of the lens element, the greater the scattering effect. It is thus possible, using different lens elements that comprise different curved light entry surfaces, to achieve a different beam angle of the light fixture. For example, a spotlight, a floodlight, a wide floodlight, or an oval light distribution can be generated by exchanging one lens element.

The light fixture may comprise a housing having a housing portion that bears the lens element. The housing portion can be designed so as to be removable from the remaining housing parts, for example can be clipped off or screwed off. The lens element can also be overlapped or overlaid by portions of the housing, and thus be held on the housing of the light fixture.

Since the light fixture according to the invention comprises just one single lens element, the singular lens element, it is also possible to prevent undesired scattered light components, by very simple means.

Specifically, according to the invention, it is possible for the outer peripheral surface of the lens element to be blackened. As a result, total reflection in this region is entirely prevented, and scattered light components, which otherwise would be unavoidable, are entirely suppressed.

As a result, the light fixture according to the invention makes it possible to achieve a light distribution, as is known in a similar manner by the term "dark light", in reflector technology, from other light fixtures in which undesired scattered light effects are eliminated.

According to the invention, a light fixture is provided having a very large lens element. Said element can have an outside diameter that is as large or almost as large as the inner peripheral diameter of the housing. As a result, the lens element can have an extension that corresponds, or almost corresponds, to the extension of the light exit surface of the collimator. As a result, in particular efficient processing of the light within the light fixture can take place.

The planar or substantially planar or slightly curved light exit surface of the lens element also makes it possible for the same design, or a similar external design, of the light fixture, and thus a homogeneous appearance, to also be achieved for different lens elements and different curved light entry surfaces of the lens elements. In this respect, it is not possible, or at least not necessarily possible, to identify from the outside the type of lens element that is installed. As a result, it is possible to use luminaries that look identical or very similar on the outside, but that generate different light distributions. This makes it possible, for example, to achieve different light distributions of the individual light fixtures, if a plurality of light fixtures having different light distributions is mounted side-by-side, without using light fixtures that are different on the outside.

According to a further aspect, the invention relates to a light fixture according to claim 2.

The invention again proceeds from a light fixture as is disclosed in the applicant's patent application described above.

The object of the invention is again that of providing a light fixture that can be assembled in a modular manner, that allows for a change in the light distribution of the light by simple means, and that generates a qualitatively high-quality light distribution at very high efficiency.

The invention achieves this object by the features of claim 2.

The principle of the invention consists in providing a singular lens element, wherein the lens element comprises a blackened outer peripheral surface. The outer peripheral surface is in particular provided by a cylindrical outer peripheral surface. The lens element can have a circular cross section for example.

As a result of the blackening of the outer peripheral surface, total reflection is prevented in this region. Scattered light components that could appear in light fixtures of the prior art are reliably prevented in this manner. As a result, a very high degree of light efficiency is achieved.

According to a further aspect, the invention relates to a light fixture according to claim 3.

Again, the invention proceeds from a light fixture as is described in the applicant's patent application mentioned above.

Again, the object of the invention consists in providing a light fixture that can be assembled in a modular manner, that allows for a change in the light distribution of the light fixture by simple means, and that generates a qualitatively high-quality light distribution at very high efficiency.

The invention achieves this object by the features of claim 3.

The principle of the invention substantially consists in providing a light fixture that comprises a collimator that, unlike in the prior art, does not emit parallel light beams but instead focuses the light in a focal point or a focal point region. In this case, the focal point or the focal point region can be located, for example, on the optical axis of the light fixture. The lens element is arranged in particular close to the optical axis of the collimator.

In particular, the observation that the light is focused in a focal point applies only for those light components that are emitted along a region, on the entry side of the collimator that is likewise arranged on the optical axis of the collimator. When observing a real, actual extension of an LED light source, different LED light components are to be taken into account, which components enter the optically active boundary surfaces of the collimator at different entering angles, and may lead to some amount of smearing or spreading of the focal point or of the focal point region.

The collimator of the light fixture according to the invention in particular comprises a cavity, on the entry side that overlaps the LED or the group of LEDs. The cavity may be provided by a ceiling wall and by a side wall. The ceiling wall may be planar or convexly curved and, together with an opposite central portion that is arranged on the light exit side of the collimator, form a converging lens, in particular a biconvex converging lens.

The side wall regions of the cavity are surrounded by a total reflection surface. The total reflection surface can provide the entire outer side wall of the collimator, and substantially form a shell shape for example.

The aspects set out in claims 1, 2 and 3 can also be combined with one another as desired. Any type of combination of the features described in claims 1, 2 and 3 constitutes embodiments of the various inventions described in this patent application.

According to a particularly advantageous variant of the invention, the total reflection surface is formed in the manner of a Fresnel lens and is divided into a plurality of stepped portions.

According to a further advantageous embodiment of the invention, the lens element comprises a blackened outer peripheral surface. As a result, undesired scattered light effects can be prevented.

According to a further advantageous embodiment of the invention, the lens element can be detachably fixed to the housing. As a result, simple manipulation of the exchangeability of the lens element can be achieved, in order to achieve a modified light distribution of the light fixture.

According to a further advantageous embodiment of the invention, the lens element is designed so as to be exchangeable. As a result, a light fixture is provided that allows for a modified light distribution to be generated simply by exchanging a lens element.

According to a further advantageous embodiment of the invention, the lens element is designed so as to be rotationally symmetrical. This allows for a spotlight, floodlight or wide floodlight distribution to be provided.

It may in particular be possible for a first lens element to be designed so as to be rotationally symmetrical, and for a second lens element to also be designed so as to be rotationally symmetrical. In the mounting state thereof on the light fixture, the two lens elements can generate different light distributions, e.g. different beam angles. It is thus possible, for example, for a first narrow light distribution, e.g. a spotlight distribution, to be generated by a first lens element, and for a comparatively wider light distribution, e.g. a floodlight or wide floodlight distribution, having a correspondingly larger beam angle, to be generated by a second lens, in the mounted state.

According to a further advantageous embodiment of the invention, the lens element is designed so as to be rotationally asymmetrical, and provides an oval light distribution. The rotationally asymmetrically designed lens element can comprise a cylindrical, concavely curved light entry surface, and can spread the light in one direction, along one plane, and allow the light along a second plane, which is perpendicular to the first plane, to pass through uninfluenced, or to spread said light at a different, smaller angle.

According to a further advantageous embodiment of the invention, the lens element comprises a dome-like concavely curved light entry surface. This provides the possibility of achieving a rotationally symmetrical light distribution of the light fixture, by simple means.

According to a further advantageous embodiment of the invention, the lens element comprises a cylindrically concavely curved light entry surface. This allows for a light fixture having a rotationally asymmetrical light distribution, e.g. an oval light distribution, to be provided by structurally simple means.

According to a further advantageous embodiment of the invention, the collimator comprises a cavity that overlaps the LED and has a light entry surface. This makes it possible to collect all the light emitted by the LEDs, and thus provide a very efficient light fixture, in a manner having a simple design.

According to a further advantageous embodiment of the invention, the cavity comprises a ceiling wall that is opposite a central portion, on a light exit surface of the collimator, wherein the ceiling wall, together with the central portion, forms a converging lens, e.g. a biconvex converging lens. All the light components that, proceeding from the LED, strike the ceiling wall, are guided from there to the central portion. Both the ceiling wall of the cavity and the central portion are convexly curved, and in this respect bring about focusing of the light components.

According to a further preferred embodiment of the invention, a side wall of the cavity is surrounded by a total internal reflection surface. In a first variant of the invention, the total reflection surface is designed so as to be substantially shell-shaped. In an alternative embodiment of the invention, the total reflection surface is formed in the manner of a Fresnel lens and is divided into a plurality of total reflection surface portions.

This provides the possibility of optimal light transmission and focusing of the light.

Providing a total reflection surface in the manner of a Fresnel lens furthermore provides the possibility of achieving a very low axial design height of the light fixture, such that a higher degree of miniaturization of the light fixture can be achieved.

According to a further advantageous embodiment of the invention, the collimator is designed to focus light in a focal point or in a focal point region. This makes it possible to achieve a very high degree of efficiency of the light fixture.

According to a further advantageous embodiment of the invention, the lens element is arranged between the collimator and the focal point or the focal point region. This makes it possible to provide a light fixture that is very efficient and small-scale, in particular short in the axial direction.

According to a further advantageous embodiment of the invention, the lens element has an outside diameter that corresponds, or substantially corresponds, to an outside diameter of the collimator. This provides the possibility of a particularly simple design of the light fixture according to the invention, in particular taking account of the fact that this also allows for scalability of the light fixture, in an unmodified structure, for different sizes of the light fixture, i.e. for example for different diameters of the housing.

Furthermore, this design makes it possible for a particularly efficient light fixture to be provided.

According to a further advantageous embodiment of the invention, the lens element is arranged close to a light exit opening of the housing. This allows for a particularly small structure of the light fixture according to the invention.

According to a further advantageous embodiment of the invention, the housing comprises an annular end face in the region of the light exit opening thereof. The light exit surface of the lens element can be arranged so as to be flush, or approximately flush, with the annular end face, or can be arranged so as to be slightly offset, toward the inside, relative to the annular end face. This provides the possibility of designing a light fixture that is axially very short.

According to a further embodiment of the invention, a diffuser is arranged between the collimator and the lens element. This can force a lower diffuseness on the light flux, and provide the light as a whole with Gaussian blurring, in order to prevent streak formation for example.

The invention furthermore relates, according to claim 21, to a system for building light fixtures.

The object of the invention is that of providing a system by means of which light fixtures having different radiation characteristics can be provided, in a structurally simple design.

The invention achieves this object by the features of claim 21.

In order to avoid repetition, with regard to the explanation of the features of claim 21, and with regard to the explanation of the particularities and advantages according to the invention, reference is made to the statements above.

Since the system comprises a light fixture comprising two (or more) different lens elements, and one lens element can be exchanged for another lens element, the light distribution of the light fixture can be modified in an extremely simple manner. In this case, rotationally symmetrical lens elements having different beam angles, or rotationally asymmetrical light distributions, e.g. for achieving an oval light distribution, can be used.

Figure 2:
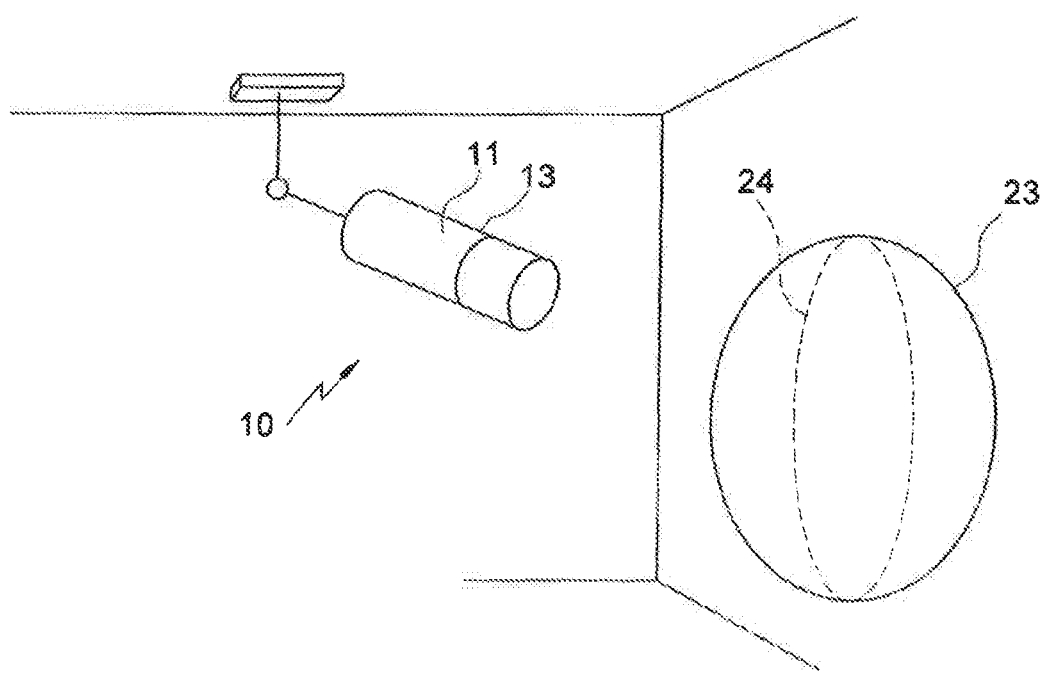
Figure 3:
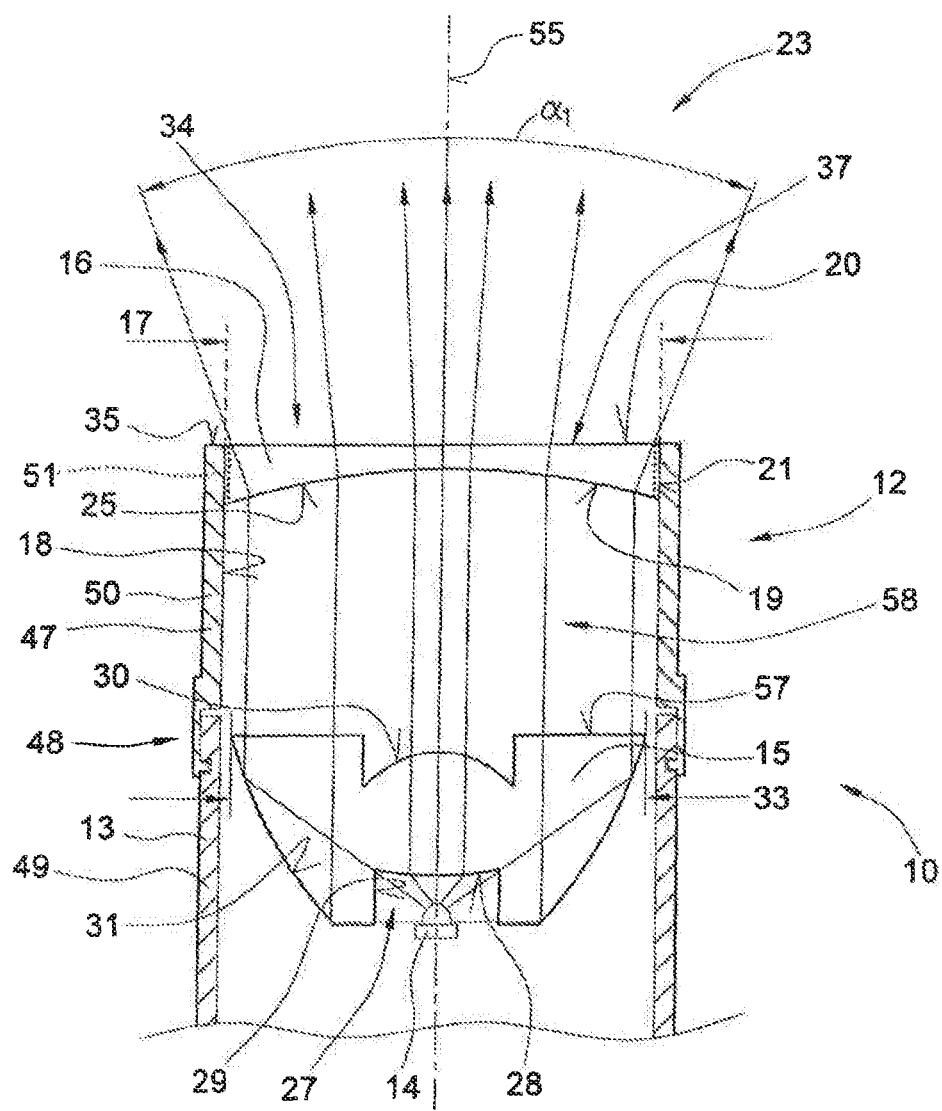
Figure 4:
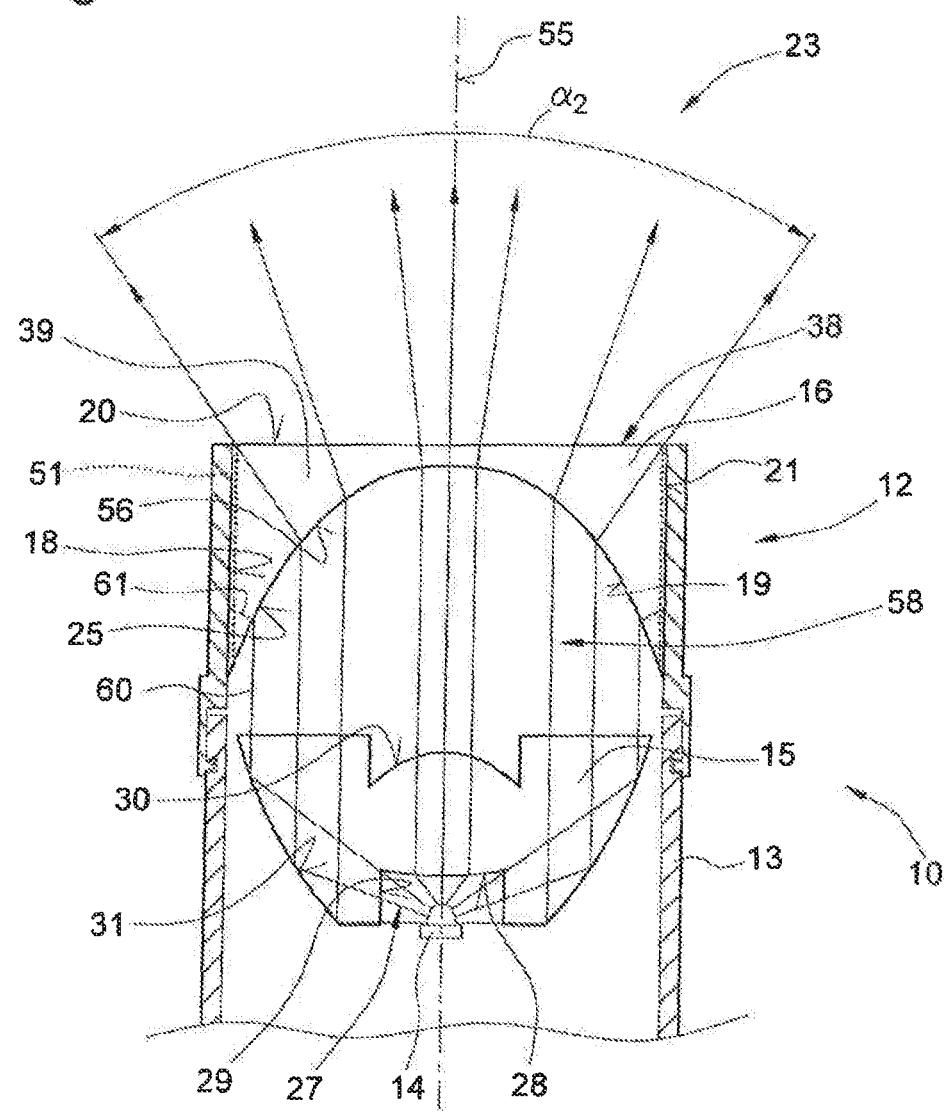
Figure 5C:
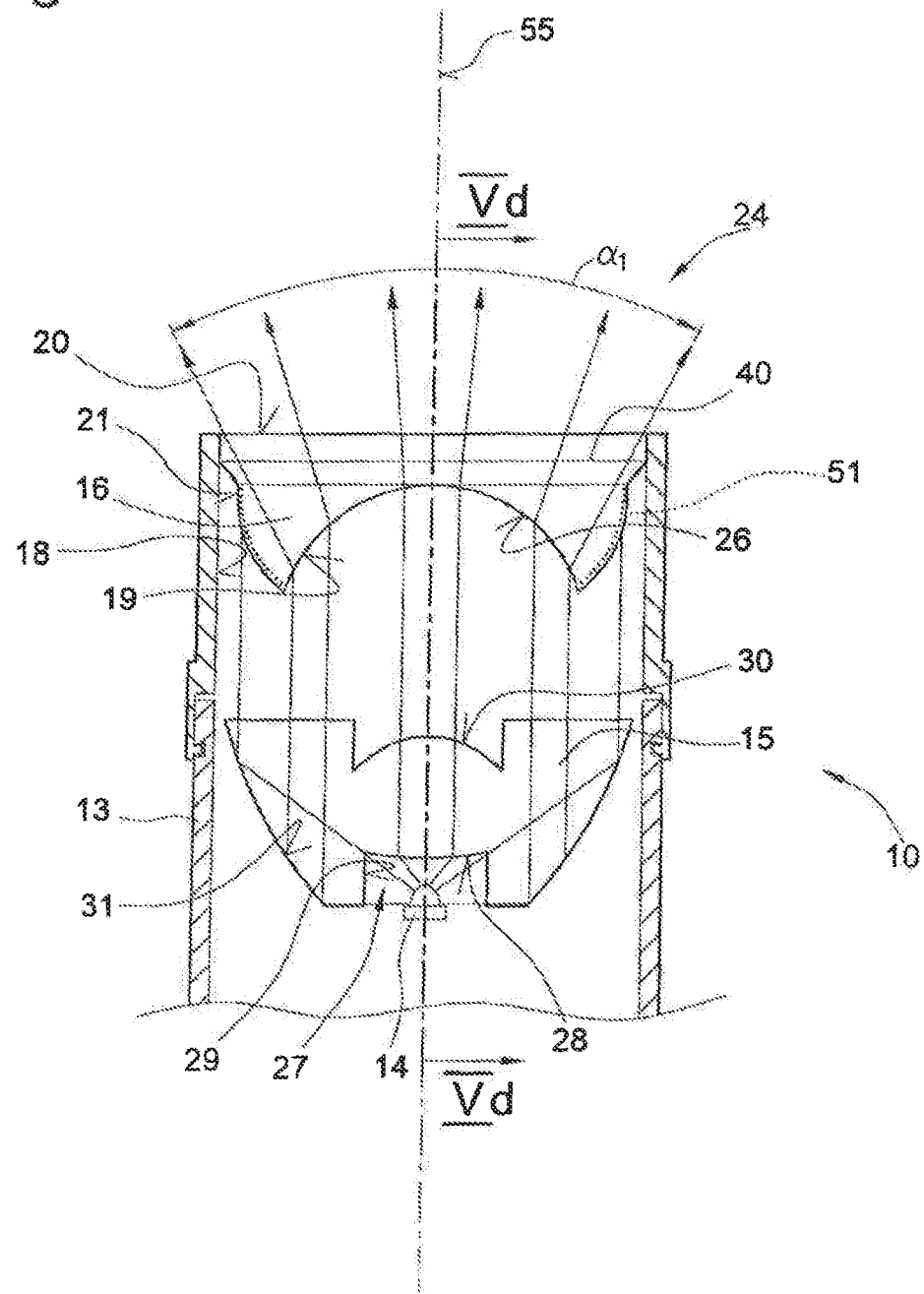
Figure 5D:
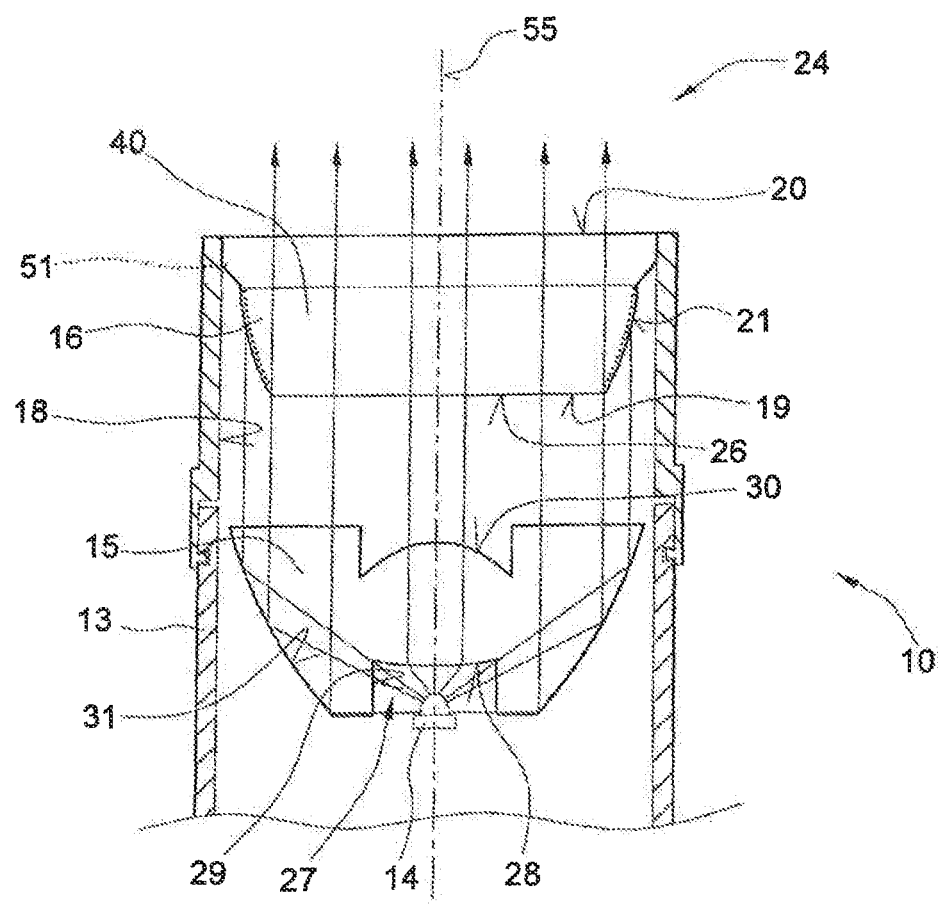
Figure 6B:
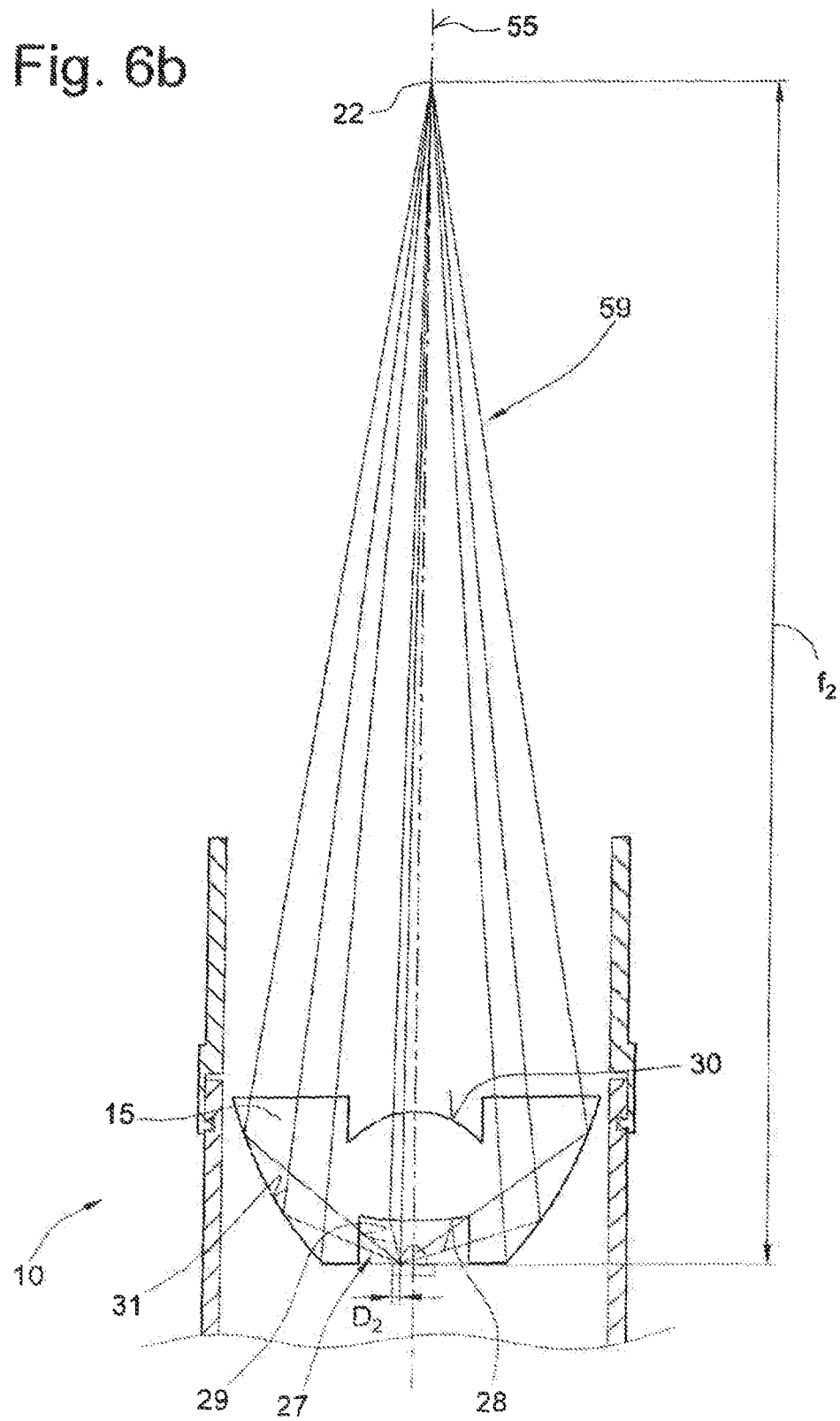
Figure 8:
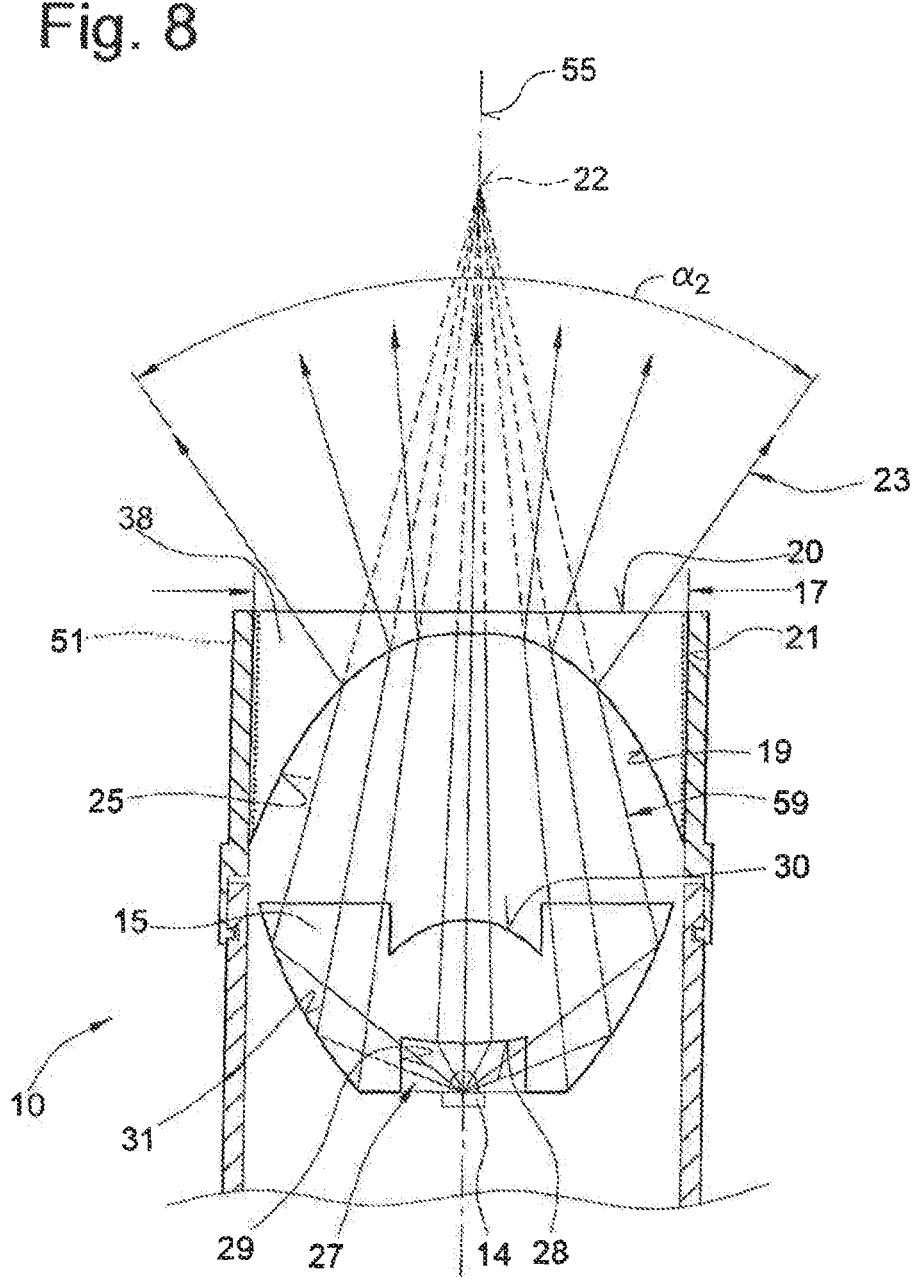
Figure 9:
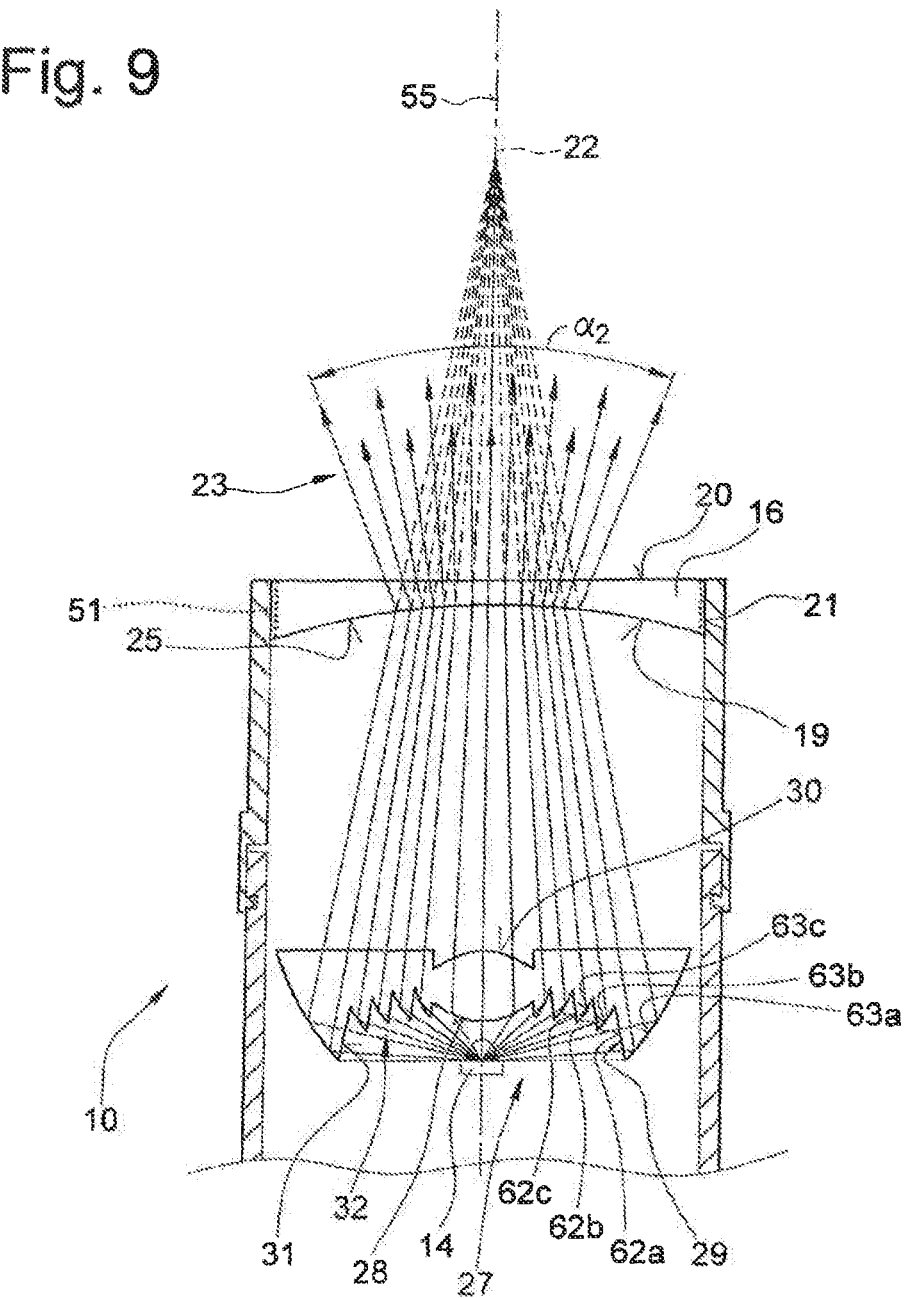

Further advantages of the invention will become clear from the dependent claims (not cited), and with reference to the following description of the embodiments shown in the drawings. In said drawings:

FIG. 1 is a schematic, perspective, partially sectional view of a room of a building, on the ceiling of which an embodiment of a light fixture according to the invention is mounted, which light fixture generates a first light distribution on a side wall of the building, FIG. 2 is a further embodiment of a building light fixture according to the invention, in a view according to FIG. 1, in which a modified light distribution is generated on the building wall to be illuminated, by means of the building light fixture, by using a different lens element, FIG. 3 is a partially sectional, schematic view of an embodiment of a building light fixture according to the invention, showing the housing, the collimator, and the lens element, wherein a first light distribution having a first beam angle is generated, FIG. 4 shows a further embodiment of a building light fixture according to the invention, in a view according to FIG. 3, wherein a second, modified light distribution, having a second beam angle, is generated by using a second lens element that is different from the first lens element, FIG. 5a is a schematic view of an embodiment of a third lens element that comprises a cylindrically curved light entry surface and is used for generating an oval light distribution, FIG. 5b is a partially sectional, schematic view of the lens element of FIG. 5a, approximately along the cutting line Vb-Vb in FIG. 5a, FIG. 5c shows a further embodiment of a building light fixture according to the invention, in a view according to FIG. 3, when the lens element of FIG. 5a is used, FIG. 5d shows the embodiment of FIG. 5c, in a drawing according to FIG. 3, approximately along the cutting line Vd-Vd in FIG. 5c, FIG. 6a shows a further embodiment of a building light fixture according to the invention, using a collimator that focuses light in a focal point, wherein, in order to simplify the drawing, the lens element is not shown, FIG. 6b shows a further embodiment of a building light fixture according to the invention, in a view according to FIG. 6a, using a modified collimator having an increased focal length compared with FIG. 6a, FIG. 7 shows a further embodiment of a building light fixture according to the invention, using the collimator of FIG. 6a with a lens element that is additionally shown, FIG. 8 shows a further embodiment of a building light fixture according to the invention, in a view according to FIG. 7, comprising a lens element that is modified compared with FIG. 7, achieving a modified light distribution, FIG. 9 shows a further embodiment of the building light fixture according to the invention, in a view according to FIG. 7, using a collimator that focuses light into one focal point, the total reflection surface of which collimator is formed in the manner of a Fresnel lens, and FIG. 10 shows a further embodiment of a building light fixture according to the invention, in a view according to FIG. 9, wherein a diffuser is arranged in the light path between the collimator and the lens element.

Embodiments of the invention are described by way of example in the following description of the figures, also with reference to the drawings. In this case, for the sake of clarity, even with respect to different embodiments, identical or comparable parts or elements or regions are denoted using the same reference signs, sometimes with the addition of lower-case letters.

Features that are described, shown or disclosed only with reference to one embodiment, can also be provided, within the scope of the invention, in any other embodiment of the invention. Even if not shown in the drawings, embodiments amended in this way are also covered by the invention.

All the disclosed features are per se essential to the invention. The content of the disclosure of associated priority documents (copy of the prior application), as well as the cited documents and the described devices of the prior art are hereby also incorporated, in full, into the disclosure of the application, also for the purpose of incorporating individual or a plurality of features of the subjects disclosed therein into one or more claims of the present invention. Even if not shown in the drawings, amended embodiments of this kind are also covered by the invention.

A first embodiment of a light fixture, denoted as a whole by 10 in the drawings, will first be explained with reference to FIGS. 1 and 2:

FIG. 1 is a schematic view of a room of a building, wherein the light fixture, formed as a spotlight 11, is arranged on the ceiling 43 of a room of a building. The room comprises two side walls 41 and a base wall 42. The wall to be illuminated is denoted 44.

As mentioned above, the light fixture according to the invention can also illuminate floor surfaces or works of art or outside surfaces.

In the embodiment of FIG. 1, a rotationally symmetrical, in particular for example circular, light distribution 23, e.g. a narrow spot distribution, is generated on the wall 44 to be illuminated.

It is clear from FIG. 1 that the light fixture 10, formed as a spotlight 11, is retained on a mounting device 45 that is attached on the ceiling side. This can for example be a busbar or another type of attachment. A hinge 46 or swivel bearing is shown, such that it is possible to orient the light fixture 10 in space and fix it.

The embodiment of FIG. 2 shows the same light fixture, wherein a different lens element is used. Using the lens element makes it possible for the light fixture of FIG. 2 to generate a modified light distribution 23 that is likewise rotationally symmetrical. It is easy to identify, from a comparison of FIGS. 1 and 2, that the second light distribution 23 according to FIG. 2 is larger than the light distribution 23 of FIG. 1 and has a larger diameter. The light distribution of FIG. 1 can for example also be denoted, in a manner conventional in the art, a narrow spot light distribution, and the light distribution of FIG. 2 can be denoted a spot light distribution. If the light distribution 23 is even larger than that shown in FIG. 2, reference can be made, for example, to a flood or a wide flood light distribution.

In a further embodiment of the invention, yet another lens element can be used in the light fixture 10, which lens element will be described only later in the text, with reference to the embodiments of FIGS. 5a to 5d. In the case of a lens element of this kind, a non-rotationally symmetrical or rotationally asymmetrical light distribution can be generated that is indicated in FIG. 2 as a dashed oval 24. An oval light distribution 24 of this kind is merely one example for any desired different rotationally asymmetrical light distributions that are covered by the invention.

The light fixtures 10 of FIGS. 1 and 2 together form a system of light fixtures according to the invention. A system of light fixtures according to the invention is already formed by providing a light fixture having two different lens elements.

With reference to the embodiments of FIGS. 3 and 4, firstly details of the embodiments of luminaries according to the invention having a rotationally symmetrical light distribution 23 will now be explained.

It can be seen from FIG. 3 that the light fixture 11 comprises a housing 13. This can in particular be symmetrical, more particularly circular cylindrical in cross section. In the following, it is assumed that all the embodiments shown in the drawings individually comprise cylindrical housings, wherein of course other housing shapes are also covered by the invention.

It can be seen from FIG. 1 that the light fixture 10 comprises an LED 14. The LED 14 is arranged on a circuit board (not shown in the drawings, for reasons of simplified illustration). Furthermore, heat sinks can be provided, and mounting elements for fastening the LED to the housing base (not shown), or another manner of fastening the LED relative to the housing 13.

The invention covers embodiments comprising just one LED. The invention also covers the case in which the light fixtures comprise a plurality of or a group LEDs, optionally also differently colored LEDs.

The LED 14 emits light, for example having a Lambertian distribution. In the embodiment of FIG. 3, the light path is shown schematically by a total of seven light arrows.

The collimator 15 comprises a cavity 27 that overlaps the LED 14. The cavity 27 comprises a cover wall 28 that is planar or, according to the embodiment of FIG. 3, is slightly convexly curved.

In the region of the light exit surface of the collimator 15, the cover wall 28 is arranged opposite a central portion 29 that likewise has a convexly curved surface. In this respect, the pair of surfaces of the cover wall 28 and central portion forms a converging lens.

The peripheral side wall 29 of the cavity 27 can be provided by a circular cylindrical surface. The invention also covers the case in which the cavity has a conically tapering cross section.

The light components emitted by the LED and entering the collimator 15 through the peripheral side wall reach a total reflection surface 31 and are deflected from there to the light exit surface 57 of the collimator 15.

In particular, the collimator 15 is designed such that a substantially parallel light beam 58 is emitted.

In this respect, the light components emitted by the LED are separated into two light components:

The light components striking the cover wall 28 are deflected toward the central portion 30, and the light components entering the collimator 15 through the peripheral side wall 29 are directed toward the light exit surface 57, via the total reflection surface 31.

According to FIG. 3, the light fixture 10 furthermore comprises a lens element 16 that is arranged in the beam path of the light emitted by the collimator 15. The lens element 16 is arranged in the region of the light exit opening 34 of the housing 13. The housing 18 can for example comprise a first housing part 49 and a second housing part 50. The second housing part 50 can be formed in the manner of a cap or in the manner of a closure ring. The housing part 50 can be provided as a detachable housing part 47. Detachment of the detachable housing part 47 from the first housing part 49 can be performed by means of a detachable connection 48, e.g. a detachable screw connection or an annular snap connection, or a type of bayonet connection, or the like.

The lens element 16 can be fastened, in particular detachably fastened, to the removable housing part 47.

According to the embodiment of FIG. 3, the housing 18 comprises an annular end face 35. This is arranged so as to be substantially flush with a light exit surface 20 of the lens element. In further embodiments, not shown in the drawings, the free end region 35 of the housing 18 can also overlay the light exit surface 20, at least in part, and in this way hold the lens element 16 axially on the housing 13. The lens element can furthermore also be fixed, in particular detachably fixed, to the housing 13 by means of fastening elements, e.g. by means of snap hooks or clamping fasteners (not shown in the drawings).

The lens element 16 has an outside diameter 17 that corresponds, or substantially corresponds, to the outside diameter 33 of the collimator. In particular, the outside diameter 17 of the lens element 16 extends as far as the inner peripheral surface 18 of the housing 13.

The lens element 16 according to FIG. 3 comprises a concavely curved light entry surface 19. In this embodiment, the light entry surface 19 is concavely curved in a dome-like manner, for example spherically or aspherically curved, such that the entry surface 19 of the lens element 16 provides a light entry surface 35 that is curved in a dome-like manner as a whole.

The lens element 16 of FIG. 3 is denoted the first rotationally symmetrical lens element 37. In contrast, the embodiment of the light fixture 10 according to FIG. 4 comprises a second rotationally symmetrical lens element 38 that is modified in comparison with said first rotationally symmetrical lens element.

Once again, the light exit surface of the lens element 38 (as similarly in the case of the first lens element 37) is held in a planar manner. The light entry surface 19 of the lens element 38 according to FIG. 4 is likewise concavely curved and comprises, overall, a light entry surface 25 that is curved in a dome-like manner.

However, the light entry surface 19 of the second lens element 38 according to FIG. 4 has a curvature that is modified compared with the curvature of the lens element 16 according to FIG. 3.

It is clear from FIGS. 3 and 4 that the two lens elements 37, 38 each function as a diverging lens. A light beam 58 that strikes the lens element 37, 38 in parallel is spread out. In the embodiment of FIG. 3, the spreading takes place at a beam angle ?1, and in the embodiment of FIG. 4, owing to the greater curvature of the light entry surface 19, more significant spreading occurs, to a larger beam angle ?2.

In this respect, in the light fixture 10 according to FIG. 1 for example a lens element 37 according to FIG. 1 is used, whereas, in the embodiment of FIG. 2, a lens element 38 according to FIG. 4 is used.

It should be noted that the figures are not to scale, but are to be understood as merely schematic and principle drawings.

In this respect, exchanging the lens element or exchanging a cap element 47, 50, together with the lens element 37, 38 fastened thereto, makes it possible to modify the light distribution 23 of the light fixture 10 in an extremely simple manner.

An embodiment of a lens element 16 and a light fixture will now be explained with reference to FIGS. 5a to 5d, by means of which light fixture a rotationally symmetrical light distribution 24 can be generated.

In this respect, FIGS. 5a to 5d show a rotationally symmetrical lens element 40 that can generate an oval light distribution 24 according to FIG. 2 (shown in dashed lines there).

The lens element 40 according to FIGS. 5a to 5d comprises a cylindrically (concavely) curved light entry surface 26. Said surface can be seen clearly in the view of FIG. 5a and the cross-sectional view of FIG. 5b.

The lens element of FIGS. 5a and 5b is used in the embodiment of a light fixture according to FIGS. 5c and 5d. The different light distributions along the two different paper planes can be seen in the two different sectional planes of FIGS. 5c and 5d.

FIG. 5d shows, in a manner corresponding to the paper plane in FIG. 5b, that the parallel light beam emitted by the collimator 15 passes through the light element 40 without undergoing any modification.

It is clear, however, when looking at FIG. 5c, that spreading of the light at an angle ?1 takes place in a sectional plane that is perpendicular to the paper plane of FIG. 5d. It is thus possible to achieve an oval light distribution overall.

In this respect, exchanging a rotationally symmetrical lens element 39 e.g. according to FIG. 4 for a rotationally asymmetrical lens element 40 according to FIGS. 5a and 5b makes it possible for the light fixture, by way of modification, to generate a rotationally asymmetrical light distribution 24 instead of a rotationally symmetrical light distribution 23.

With reference to FIGS. 6a and 6b, it will now be explained, for further embodiment of a light fixture according to the invention, that a modified collimator 15 can be used:

The basic structure of a light fixture according to FIGS. 6a and 6b corresponds to the structure of the light fixture explained with reference to FIGS. 3 and 4, wherein the lens element has been omitted in the drawings of FIGS. 6a and 6b for the sake of clarity.

The basic structure of the collimator 15 according to FIGS. 6a and 6b also substantially corresponds to the basic structure of the collimator 15 as is used in the light fixture according to FIGS. 3 and 4.

In this case, however, as a result of a modified selection of the optical boundary surfaces of the collimator 15, i.e. the lens entry surfaces 28, 29, the total reflection surfaces 31, and the light exit surfaces 57, in particular of the central portion 30, the light beam 59 emitted by the collimator 15 according to FIG. 6a does not provide a beam of parallel light, but rather is generated as light beam that is directed toward a focal point or focus 22. In this case, as can be seen from a comparison of FIGS. 6a and 6b, the modified selection of the optical boundary surfaces of the collimator 15 makes it possible for a different focal length $f_1$ or $f_2$ to be set.

It is clear on the basis of the embodiments of FIGS. 7 and 8 that, in further embodiments of light fixtures 10 according to the invention according to FIGS. 7 and 8, lens elements 37, 38, which correspond to the lens elements of the embodiments of FIGS. 3 and 4, can be inserted into the light beam 59 and positioned such that the lens element 37, 38 is located between the collimator 15 and the focal point 22.

The corresponding beam path is shown schematically in FIGS. 7 and 8. It can be seen that the relevant light entry surface 19 of the relevant lens element 37, 38 can capture the entire light beam 59 emitted by the collimator 15.

The advantage of using collimator elements 15 of this kind according to FIGS. 6a to 10, which do not emit the light in parallel but rather as a focused light beam 59, is explained with reference to FIG. 4:

It is clear, therein, that, in particular when using significantly curved light entry surfaces 19 of the lens elements 16, peripheral rays, such as the peripheral ray 60, are refracted so significantly toward the outside (cf. partial beam 61) that they can no longer be deflected toward the building surface 44 to be illuminated.

As a result, losses of light are to be feared here.

If, as indicated in embodiments 7 and 8, but differently to what is shown in FIG. 4, the collimator emits a light beam 50 that is collimated into a focal point 22, and not a parallel light beam 58, the entire light flux can be captured, processed and cast onto the building wall 44 to be illuminated, by means of the lens element 16.

It can be seen from the embodiment of FIG. 9 that a further embodiment is proposed, in which the total reflection surface 31 of the collimator 15 is formed in the manner of a Fresnel lens 32. In this case, the entry surface 29 of the cavity 27 is divided into a plurality of substantially vertically oriented portions 62a, 62b, 62c, 62, wherein each of said portions is associated with a portion 63a, 63b, 63c of a total reflection surface.

As a result, the design height of the collimator 15 can be kept low, in particular in the event of large diameters of the housing 13, such that a high degree of miniaturization is achieved here too.

It can be seen from FIG. 10 that a diffuser 36 can be arranged in the light path between the collimator 15 and the lens element 16. A diffuser 36 of this kind can homogenize the light emitted by the collimator 15 and for example prevent interference structures that may lead to streak formation for example.

In many embodiments of a light fixture according to the invention, the outer peripheral surface of the lens element 16 is denoted 21 and is blackened. The blackening is indicated as a dotted line 51. In the embodiments of FIGS. 3 and 4, as well as 7 to 10, the outer peripheral surface 21 of the relevant lens element 16 is formed of a cylindrical surface. In this case, said cylindrical surface is completely blackened, such that in particular total reflection is excluded in this region.

The blackening can be applied as a coating layer for example.

If blackening does not take place, it is conceivable that, provided the angle of incidence thereof is below the total reflection angle, the partial beam denoted 61 in FIG. 4 is reflected inside the lens element 16 and also leads to scattered light components. Complete blacking of the outer peripheral surface 21 of the lens element makes it possible for scattered light effects to be prevented.

The rotationally asymmetrical lens element 40 according to FIGS. 5a to 5d has also undergone indicated blackening 51 on the outer peripheral surface 21 thereof, which blackening can be applied for example by a coating, painting, etc.

The light fixture according to the invention and the system of light fixtures according to the invention allow for simple scalability of light fixtures, from very small light fixtures, via medium-small light fixtures, to medium light fixtures, to large light fixtures and very large light fixtures. In this case, for every size of light fixture, a plurality of rotationally symmetrical and rotationally asymmetrical light distributions can be generated by providing one individual lens element. Spot, flood, wide flood and extra-wide flood distributions, for example, are possible as a rotationally symmetrical light distribution.

Within the context of the invention, it has been found that, at a particular size of a light fixture, in order to achieve a very specific light distribution, it is expedient to provide a lens element having a convexly curved, but only slightly convexly curved, light entry surface, instead of a lens element having a concavely curved light entry surface. A lens element of this kind then functions not as a scattering lens but instead as a converging lens.

Therefore, a system of light fixtures according to the invention can therefore additionally also comprise luminaries having lens elements that are formed as a converting lens, and at least one slightly convexly curved light entry surface.

The invention claimed is:

1. A light fixture comprising:
   a cylindrical housing of circular cross section and having a center axis defining an optical axis of the fixture, a front end of a predetermined outer diameter, and a rear end also of the predetermined outer diameter;
   a mount fixable adjacent a first building surface;
   a hinge or swivel bearing carried on the mount and secured to the housing;
   an LED mounted in the housing on the center axis;
   a single collimator mounted on the optical axis in the housing receiving light from the LED, having a predetermined length measured parallel to the optical axis, and positioned in the housing a predetermined spacing greater than the predetermined length from a front end face of the front end; and
   a single scattering lens mounted in the housing at the front end thereof, having a center portion centered on the optical axis, an outer periphery extending to an inner peripheral surface of the housing, a concavely curved light entry surface receiving light from the single collimator, and a planar or slightly convexly curved light exit surface directing the received light outside the housing onto a second building surface, a thickness of the scattering lens increasing outwardly from the center portion to the outer periphery of the lens.

2. The light fixture according to claim 1, wherein the lens further has a blackened outer peripheral surface.

3. The light fixture according to claim 1, wherein the single collimator focuses light in one focal point or in a focal point region.

4. The light fixture according to claim 1, wherein the outer periphery of the scattering lens is blackened.

5. The light fixture according to claim 1, wherein the scattering lens is detachably fixable to the housing.

6. The light fixture according to claim 1, wherein the scattering lens is exchangeable.

7. The light fixture according to claim 1, wherein the scattering lens is rotationally symmetrical.

8. The light fixture according to claim 1, wherein the scattering lens is rotationally asymmetrical and provides an oval light distribution.

9. The light fixture according to claim 7, wherein the light entry surface is concavely curved in a dome.

10. The light fixture according to claim 8, wherein the light entry surface is cylindrically concavely curved.

11. The light fixture according to claim 1, wherein the single collimator has a cavity that overlaps the LED and forms a light entry surface of the single collimator.

12. The light fixture according to claim 11, wherein the cavity has a cover wall that is opposite a central portion of the single collimator on a light exit surface, the cover wall together with the central portion forming a biconvex converging lens.

13. The light fixture according to claim 11, wherein the cavity has a side wall that is surrounded by a total reflection surface.

14. The light fixture according to claim 13, wherein the total reflection surface is a Fresnel lens.

15. The light fixture according to claim 1, wherein the single collimator focuses light in a focal point or in a focal point region.

16. The light fixture according to claim 3, wherein the scattering lens is between the single collimator and the focal point or the focal point region.

17. The light fixture according to claim 1, wherein the scattering lens has an outer diameter that substantially corresponds to an outer diameter of the single collimator.

18. The light fixture according to claim 1, wherein the scattering lens is close to a light exit opening of the housing.

19. The light fixture according to claim 18, wherein the housing has an annular end face in the region of the light exit opening the light exit surface of the scattering lens being flush or approximately flush to the annular end face or so as to be slightly inwardly offset to the annular end face.

20. The light fixture according to claim 1, further comprising:
a diffuser between the single collimator and the scattering lens.

21. A system comprising:
a cylindrical housing having a center axis providing an optical axis and a front end with a front end face;
a mount fixable adjacent a first building surface;
a hinge or swivel bearing carried on the mount and secured to the housing for variable positioning of the housing;
an LED in the housing and centered on the optical axis,
a single collimator receiving light from the LED, having a predetermined length measured along the optical axis, and positioned in the housing at a predetermined spacing greater than the predetermined length from the front end face; and
a first single scattering lens mounted in the housing at the front end, having a center portion centered on the optical axis, an outer periphery extending as far as an inner peripheral surface of the housing, a concavely curved light entry surface receiving light from the single collimator, and a planar or slightly convexly curved light exit surface emitting light outside the housing on a second building surface, a thickness of the scattering lens increasing outwardly from the center portion to the outer periphery of the lens, the first scattering lens being exchangeable for
a second scattering lens for achieving a modified light distribution and having a respective outer periphery in a mounted state extending as far as an inside peripheral surface of the housing, the second scattering lens having a second concavely curved light entry surface that is different from the light entry surface of the first scattering lens, and a planar or slightly convexly curved light exit surface.

22. The system according to claim 21, wherein the first scattering lens is rotationally symmetrical, and the second scattering lens is rotationally symmetrical or rotationally asymmetrical.

23. The light fixture according to claim according to claim 1, wherein the thickness increases continuously from the center portion to the outer periphery.

24. A light fixture comprising:
a cylindrical housing of circular cross section and having a center axis defining an optical axis of the fixture, a front end of a predetermined outer diameter, and a rear end also of the predetermined outer diameter;
a mount fixable adjacent a first building surface;
a hinge or swivel bearing carried on the mount and secured to the housing;
an LED mounted in the housing on the center axis;
a single collimator on the optical axis in the housing receiving light from the LED, having a predetermined length measured parallel to the optical axis, and positioned in the housing a predetermined spacing greater than the predetermined length from a front end face of the front end; and
a single scattering lens mounted in the housing at the front end thereof, having a center portion centered on the optical axis, an outer diameter as large or nearly as large as an inner diameter of the housing, a concavely curved light entry surface receiving light from the single collimator, and a planar or slightly convexly curved light exit surface directing the received light outside the housing onto a second building surface, a thickness of the scattering lens increasing outwardly from the center portion to the outer periphery of the lens.

* * * * *